United States Patent
Ono et al.

(10) Patent No.: US 9,422,040 B2
(45) Date of Patent: Aug. 23, 2016

(54) SHIP MONITORING DEVICE

(71) Applicant: THE YOKOHAMA RUBBER CO., LTD., Tokyo (JP)

(72) Inventors: Kazunori Ono, Kanagawa (JP); Masahiko Miyamoto, Kanagawa (JP); Koji Nakatani, Kanagawa (JP); Shu Yamada, Kanagawa (JP); Shigeki Sakakibara, Kanagawa (JP); Minami Izumi, Kanagawa (JP); Michito Kaneko, Kanagawa (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 53 days.

(21) Appl. No.: 14/406,646

(22) PCT Filed: Jul. 22, 2013

(86) PCT No.: PCT/JP2013/069740
§ 371 (c)(1),
(2) Date: Dec. 9, 2014

(87) PCT Pub. No.: WO2014/017418
PCT Pub. Date: Jan. 30, 2014

(65) Prior Publication Data
US 2015/0112519 A1  Apr. 23, 2015

(30) Foreign Application Priority Data
Jul. 23, 2012 (JP) .................................. 2012-162462

(51) Int. Cl.
*B63B 43/00* (2006.01)
*B63B 43/18* (2006.01)
(Continued)

(52) U.S. Cl.
CPC ................ *B63B 43/18* (2013.01); *B63B 59/02* (2013.01); *B63B 2213/00* (2013.01); *B63B 2213/02* (2013.01); *G01C 21/203* (2013.01)

(58) Field of Classification Search
CPC ....... G08G 1/0969; G08G 1/142; G08G 1/16; G08G 1/161; G08G 1/163; G08G 1/166; G08G 1/20
See application file for complete search history.

(56) References Cited

U.S. PATENT DOCUMENTS 6,486,800 B1   11/2002 Hattori
8,519,828 B2 *  8/2013 Nakatani et al. ............. 340/10.5
(Continued)

FOREIGN PATENT DOCUMENTS

EP     0945552 A1    9/1999
EP     2078669 A1    7/2009
(Continued)

OTHER PUBLICATIONS

International Search Report dated Oct. 29, 2013 filed in PCT/JP2013/069740.

*Primary Examiner* — Jelani Smith
(74) *Attorney, Agent, or Firm* — Rankin, Hill & Clark LLP

(57) ABSTRACT

A computer 11 of a ship monitoring device 1 arranges one kind of transmission data between two consecutive start control codes and two consecutive termination control codes. The computer 11 also arranges information indicating a type of the transmission data between the transmission data and the start control codes and between the termination control codes and the transmission data. In this way, the transmission data is transmitted in form of packet data. Therefore, transmission data in information communication between ships and sensed information in information communication of fenders can be easily distinguished from each other. In addition, a type of information transmitted as the transmission data can be easily identified.

20 Claims, 8 Drawing Sheets

(51) Int. Cl.
  *B63B 59/02* (2006.01)
  *G01C 21/20* (2006.01)

(56) References Cited

U.S. PATENT DOCUMENTS

| | | | |
|---|---|---|---|
| 8,520,695 B1 * | 8/2013 | Rubin et al. | 370/445 |
| 2003/0063910 A1 | 4/2003 | Hattori | |
| 2009/0079590 A1 | 3/2009 | Hiraoka | |
| 2010/0070118 A1 | 3/2010 | Yamada | |

FOREIGN PATENT DOCUMENTS

| | | |
|---|---|---|
| JP | S63152249 | 6/1988 |
| JP | S64004144 | 1/1989 |
| JP | 2007004428 A2 | 1/2007 |
| JP | 2010175298 A2 | 8/2010 |
| WO | 9920845 A1 | 4/1999 |
| WO | 2008053887 A1 | 5/2008 |
| WO | WO 2011155265 A1 * | 12/2011 |

* cited by examiner

SHIP MONITORING DEVICE

TECHNICAL FIELD

The present invention relates to a ship monitoring device for providing an operator with information on a positional relationship between two ships and information on a state of fenders in a case where the two ships come alongside each other and in a case where the two ships are moored to each other.

BACKGROUND ART

Conventionally, in a case where a ship comes alongside another ship, an operator needs to pay close attention to prevent damage to the ship.

In a case where, in, for example, well-known STS (Ship-To-Ship) and FPSO (Floating Production Storage and Offloading), two ships such as crude oil tankers come alongside each other on the sea and loading and unloading are performed between the ships, the ships should be close to each other and moor the ships to each other. Therefore, it is extremely important to design fenders positioned between the ships and a technique of steering a ship by an operator.

For example, in a case where the weather is getting worse, a ship unintentionally approaches to another ship too close even with a technique of an operator. This breaks a fender positioned between the ships, and, in some cases, the ships contact to each other and are damaged.

In particular, in a case where the loading and unloading are performed at night after the ships are moored to each other, it is difficult to visually recognize a state of a mooring rope and fenders positioned on the sea. It is also difficult to know how much load is applied to the mooring rope and the fenders and in what state the mooring rope and the fenders are.

Therefore, the inventors of the present invention previously proposed a method and a system for assisting steering/mooring of a vessel (WO 2008/053887 A (Patent Document 1)).

In a case where ships come alongside each other and in a case where loading and unloading are performed while the ships are being moored to each other, a method and a system for assisting steering/mooring of a vessel, disclosed in Patent Document 1 display information on a positional, relationship between the two ships and information on fenders. Thus, the positional relationship between the ships and a state of the fenders can be easily understood.

There are similar known techniques including: an another ship target display device disclosed in JP-A-2007-4428 (Patent Document 2); an air pressure monitoring device of a pneumatic fender and a centralized control system for the same disclosed in JP-A-2010-175298 (Patent Document 3); and a fender and a management system therefor disclosed in WO 99/20845 A (Patent Document 4).

The other ship target display device disclosed in Patent Document 2 is configured to display positional and detailed information on almost all ships existing in a predetermined region around own ship to make an operator easily understand the positional and detailed information.

In the air pressure monitoring device of a pneumatic fender and the centralized control system for the same, disclosed, in Patent Document 3, a pneumatic fender includes a plurality of pressure sensors. The pressure sensors transmit air pressure sensing signals repeatedly in turn so that transmission states of the pressure sensors are continued at predetermined intervals. Therefore, the air pressure of the pneumatic fender can be continuously monitored.

In the fender and the management system therefor, disclosed in Patent Document 4, information storage means of a transponder provided in each of a plurality of fenders is accessed by a terminal device. Then, information stored in the information storage means is read out, and the read out information is displayed. In this way, the plurality of fenders is managed.

CITATION LIST

Patent Literatures

Patent Document 1: WO 2008/053887 A
Patent Document 2: JP-A-2007-4428
Patent Document 3: JP-A-2010-175298
Patent Document 4: WO99/20845 A

SUMMARY OF INVENTION

Problems to be Solved by the Invention

In a case where two ships come alongside each other and in a case where the two ships are moored to each other, it is extremely important for an operator to know information on a positional relationship between the both two ships and information on a state and the like of an air pressure inside a fender serving as a cushioning material, when the two ships come alongside each other. A system for enabling two ships to easily come alongside each other is disclosed in detail in Patent Document 1 as described above.

In the system disclosed in Patent Document 1, information is transmitted from each fender to a main device in radio wave communication. In addition, exchanges of information between a main device of a first ship and a main device of a second ship are performed in radio wave communication.

The inventors of the present invention perform those two types of communication with use of specified low power radios. Therefore, it is desired to be sophisticated in discrimination between the information transmitted from the each fender to the main device and the information exchanged between the main device of the first ship and the main device of the second ship. It is further desired to be sophisticated in identification of a type of communicated information.

An object of the present invention is to provide the following ship monitoring device. The monitoring device can discriminate between information communication, of fenders and information communication between two ships. The monitoring device can also easily identify a type of communicated information.

Solutions to the Problems

To achieve the object, the present invention provides a ship monitoring device, including: a display unit for displaying, on the basis of information on own ship navigating on the sea and information on a target ship alongside, animation of a position of the own ship and a position of the target; ship alongside to display a state in which the own ship and the target ship alongside come alongside each other; a sensed information communication unit including a specified low power radio for receiving internal air pressure information as sensed information in form of packet data, the internal air pressure information being transmitted from specified low power radios provided in a plurality of fenders, respectively, the plurality of fenders being provided in the own ship and serving as a cushioning material that is disposed between the own ship and the target ship alongside in a case where the own ship and the target ship alongside come alongside each other; and means for transmitting information on own ship, the means including a specified low power radio for transmitting the information on own ship in form of packet data to the target ship alongside, the information on own ship being one or more kinds of information including, as one kind of the information, the sensed information contained in the packet data received by the sensed information communication unit, wherein, in the ship monitoring device in which one kind of the packet data received by the sensed information communication unit has a form in which the sensed information is arranged between a start control code and a termination control code, the means for transmitting information on own ship arranges one kind of the information on own ship between two consecutive start control codes and two consecutive termination control codes, arranges type information indicating an information type of the information on own ship between the information on own ship and the start control codes and between the termination control codes and the information on own ship, and transmits the information on own ship with the two start control codes, the two termination control codes, and the type information, in form of packet data.

Effects of the Invention

In a ship monitoring device of the present invention, means for transmitting information on own ship arranges one kind of information on own ship between two consecutive start control codes and two consecutive termination control codes. The means for information on own ship also arranges type information indicating an information type of the information, on own ship between the information on own ship and the start control codes and between the termination control codes and the information on own ship. The information arranged as described above is transmitted in form of packet data of the information on own ship. Therefore, the information on own ship and sensed information can be easily distinguished from each other, and therefore a type of information transmitted as the information on own ship can be easily identified.

DESCRIPTION OF EMBODIMENTS

One embodiment of the present invention will be described below with reference to drawings.

Figure 1:
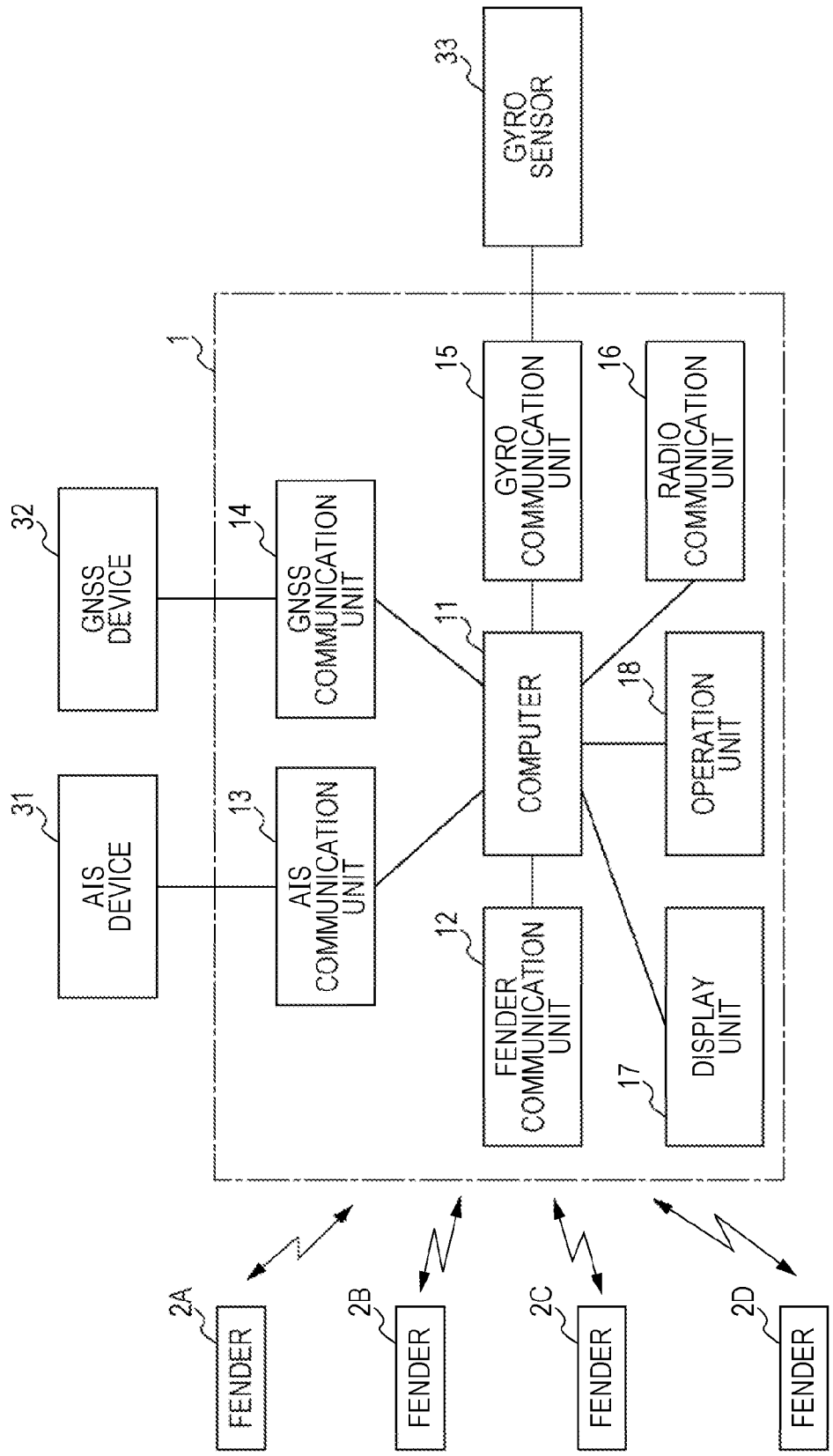
FIG. 1 is a block diagram illustrating a ship monitoring device in one embodiment of the present invention.

FIG. 1 is a block diagram illustrating a ship monitoring device in one embodiment of the present invention. In FIG. 1, a ship monitoring device 1 includes a computer 11, a fender communication unit 12, an AIS communication unit 13, a GNSS communication unit 14, a gyro communication unit 15, a radio communication unit 16, a display unit 17, and an operation unit 18. The ship monitoring device 1 is provided in a pilothouse of a ship.

The computer 11 includes a computer's main body, a keyboard, a moose, a storage device, and a display device, and the like, which are well-known in the art. A ship monitoring program is pre-stored in the storage device of the computer 11. The computer 11 is operated by the ship monitoring program. The computer 11 stores, in the storage device included in the computer 11, information obtained from the fender communication unit 12, the AIS communication unit 13, the GNSS communication unit 14, the gyro communication unit 15, and the radio communication unit 16. Based on multiple pieces of the obtained information, the computer 11 displays, on the display unit 17, in real time, animation of positional information on own ship and another ship which is a target ship alongside, and also displays, on the display unit 17, in real time, information on internal air pressures offenders. The computer 11 further displays the multiple pieces of the obtained information, on the display unit 17. In addition, the computer 11 executes an operation instruction inputted, via the operation unit 18. The computer 11 transmits the obtained information on the own ship and the obtained information on the fenders to the other ship alongside which the own ship comes (hereinafter, referred to as "target ship alongside") via the radio communication unit 16. The computer 11 also receives ship information of the target ship alongside via the radio communication unit 16. The computer 11 displays the animation, based on the received information on the target ship alongside.

The fender communication unit 12 performs communication between the computer 11 and transmitters provided in the respective fenders. Therefore, the fender communication unit 12 obtains information on air pressures, temperatures, and the like inside the fenders. The fender communication unit 12 outputs the obtained information in form of digital data to the computer 11. Usually, a ship is furnished with four fenders to be used when the ship comes alongside another ship. Each of the fenders includes the transmitter including a sensor. The air pressure and the temperature inside the fender are detected by the sensor. Results of such detection are transmitted by the transmitter. The transmitter also transmits not only information on the results of the detection of the air pressure and the temperature but also a serial number of the sensor.

As the transmitters of the fender communication unit 12 and the fenders, well-known specified low power radios are used. The results of the detection are transmitted in form of packet data. At this time, the serial number of the sensor, the information on the results of the detection of the air pressure and temperature, and the like are collected as transmission data, by a transponder of the fender. A start control code "STX" is placed in front of the transmission data and a termination control code "ETX" is placed behind the transmission data. In this way, packet data in form of "STX+transmission data+ETX" is transmitted.

The AIS (Automatic Identification System) communication unit 13 is connected to a well-known AIS device 31. The AIS communication unit 13 obtains information on an identification signal, name, a position, a course, a speed, a destination, and the like of the other ship, which has been received by the AIS device 31. The AIS communication unit 13 outputs the obtained information to the computer 11. The AIS communication unit 13 also transmits, to the other ship, AIS information on an identification signal, name, a position, a course, a speed, a destination, and the like of the own ship in form of digital data. The AIS communication unit 13 also outputs the AIS information on the own ship to the computer 11.

The GNSS (Global Navigation Satellite System) communication unit 14 is connected to a well-known GNSS device 32 including a GPS (Global Positioning System) receiver. As is well-known, the GNSS communication unit 14 receives, via a GNSS device 32, radio waves transmitted from a plurality of navigation satellites. In this way, the GNSS communication unit 14 obtains information such as the positional information, speed information, and posture information of the own ship. The GNSS communication unit 14 outputs the above information in form of digital data to the computer 11.

The gyro communication unit 15 is connected to a well-known gyro sensor 33 including a well-known gyroscope. The gyro communication unit 15 detects an angle and an angular velocity of the own ship. The gyro communication unit 15 outputs such detected information in form of digital data to the computer 11.

The radio communication unit 16 includes a well-known specified low power radio. Based on an instruction of the computer 11, the radio communication unit 16 transmits the information on the own ship in form of packet data with use of radio waves having a predetermined frequency. The radio communication unit 16 also receives information on the target ship alongside transmitted from the target ship alongside. The radio communication unit 16 sequentially stores the received information in a reception data buffer. The radio communication unit 16 also outputs such received data in form of digital data to the computer 11 in order in which the received data has been stored. For example, the information on the own ship are GPS information, gyro information, AIS information, and fender information. The GPS information has information on a position where a GPS reception, antenna is provided, information on a position (latitude, longitude) of the ship, information on the speed (speed, speed direction), and information on a bow direction. The gyro information has information on the angle and the angular velocity of the own ship. The AIS information has, for example, information on a shape (length, width) of the ship, information on a center of gravity of the ship, and information on a manifold position and regarding on which side (right or left) the ship comes alongside the target ship. The fender information has, for example, information on a shape of the fenders and information on the internal air pressures and internal temperatures of the fenders.

Information on the other ship transmitted from the other ship is similar to the above information. The above information is shared, via the radio communication unit 16, by the own ship and the other ship which is the target ship alongside. Therefore, in a case where the own ship and the other ship come alongside each other, the positional information can be exactly displayed on the own ship and the other ship in real time on the display unit 17, and thus the display unit 17 can exactly display a change in air pressures of the fenders in real time.

The computer 11 transmits various kinds of information in real time via the radio communication unit 16. Each of the various kinds of information is transmitted in form of packet data. Specifically, the computer 11 individually transmits the GPS information, the gyro information, the AIS information, and the fender information in form of packet data via the radio communication unit 16.

The computer 11 places two start control codes "STX" in front of the transmission data and places two termination control codes "ETX" behind the transmission data. Further, the computer 11 inserts a character denoting art information type of the transmission data between the start control codes and the transmission data and between the transmission data and the termination control codes. In this way, the computer 11 transmits packet data in form of "STX+STX+"G" transmission data+"G"+ETX+ETX" via the radio communication unit 16. In this example, a character "G" denoting an information type indicates that the transmission data is the GPS information. A character "Y" denoting an information type indicates that the transmission data is the gyro information. A character "A" denoting an information type indicates that the transmission data is the AIS information. A character "F" denoting an information type indicates that the transmission data is the fender information.

In a case where the computer 11 transmits a set of transmission data, the computer 11 does not start to transmit another set of transmission data until the computer 11 completes transmission of the set of the transmission data. Therefore, data can be continuously received without interruption.

The display unit 17 includes a well-known display such as a liquid crystal display. The display unit 17 displays an image and a character based on information transmitted from the computer 11.

The operation unit 18 includes a touch panel, a mouse, and a keyboard provided to the display of display unit 17. Those touch panel, mouse, and keyboard are connected to the computer 11. The operation unit 18 individually outputs, to the computer 11, an operation instruction and inputted information from an operator in form of digital data.

Figure 2:
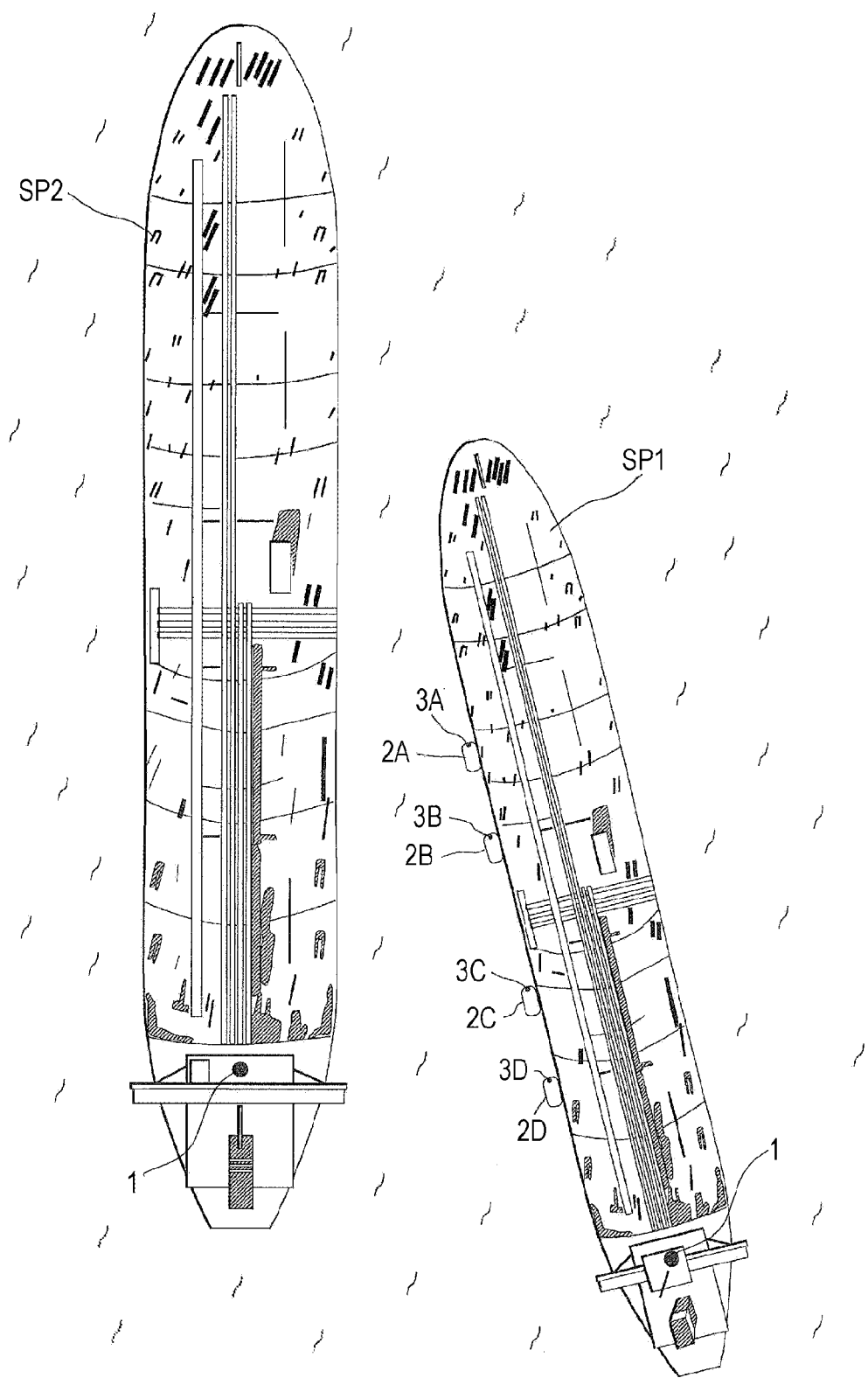
FIG. 2 illustrates a state of a target ship alongside and own ship on the sea.
Figure 3:
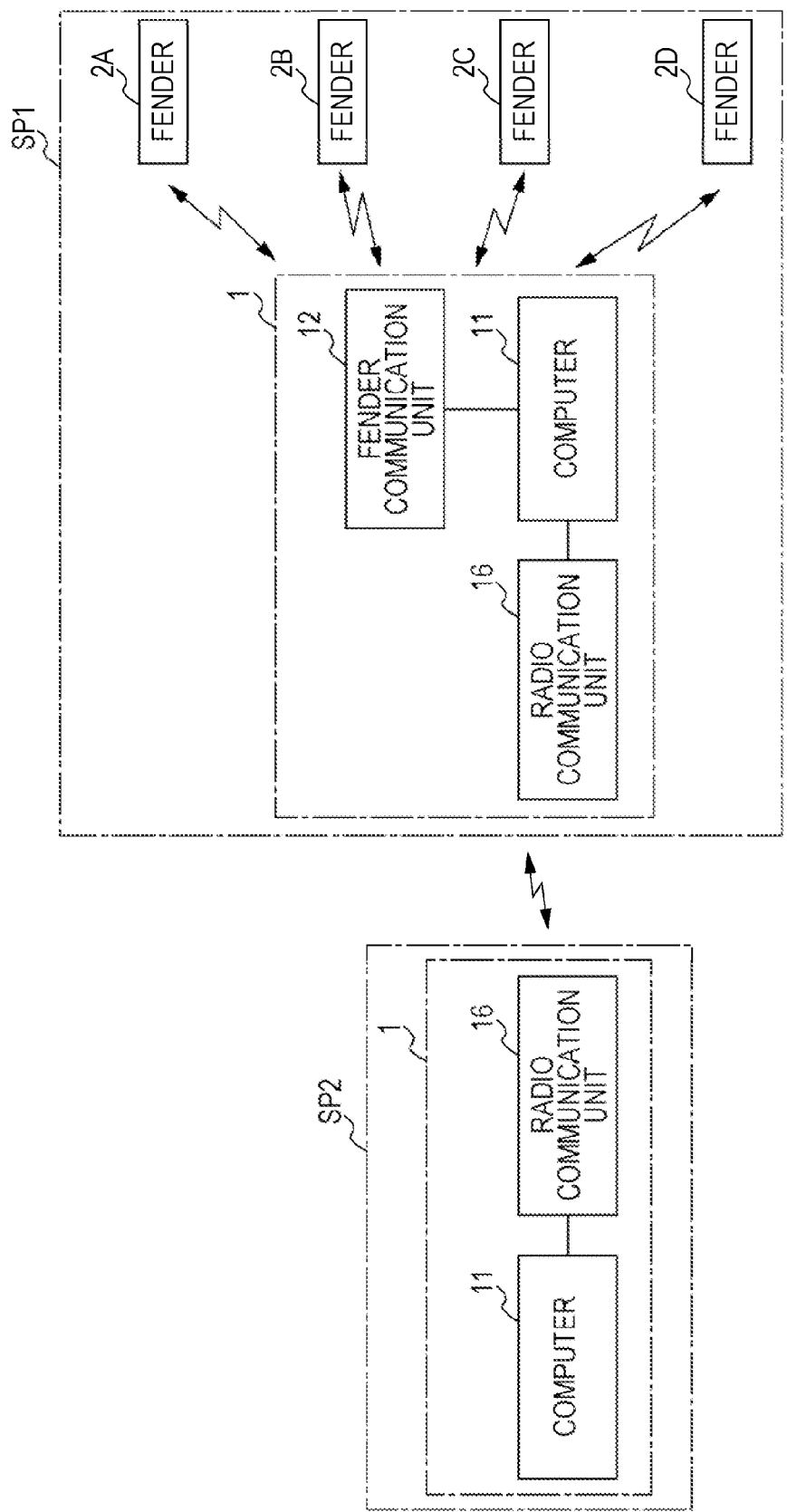
FIG. 3 is an explanatory view of communication of a ship monitoring device and communication between the ship monitoring device and fenders in one embodiment of the present invention.

An operation, of the ship monitoring device in this embodiment will be described with reference to FIG. 2 to FIG. 8. As shown in FIG. 2, this embodiment will describe a case where, in a case where, on the sea, the own ship SP1 comes alongside the target ship alongside SP2 anchored on the sea, information are exchanged via radio communication between own ship SP1 and a target ship alongside SP2. Note that, as shown in FIG. 2 and FIG. 3, the target ship alongside SP2 is furnished with a ship monitoring device 1 equivalent to a ship monitoring device 1 with which the own ship SP1 is furnished. The own ship SP1 is furnished with four fenders 2A, 2B, 2C, and 2D on a left side of the ship. The fenders 2A, 2B, 2C, and 2D include transmitters 3A, 3B, 3C, and 3D, respectively.

In a case where the computer 11 transmits information, the computer 11 performs a process for transmitting GPS information, a process for transmitting gyro information, a process for transmitting AIS information, and a process for transmitting fender information. In a case where the computer 11 receives information, the computer 11 performs an information reception process.

Figure 4:
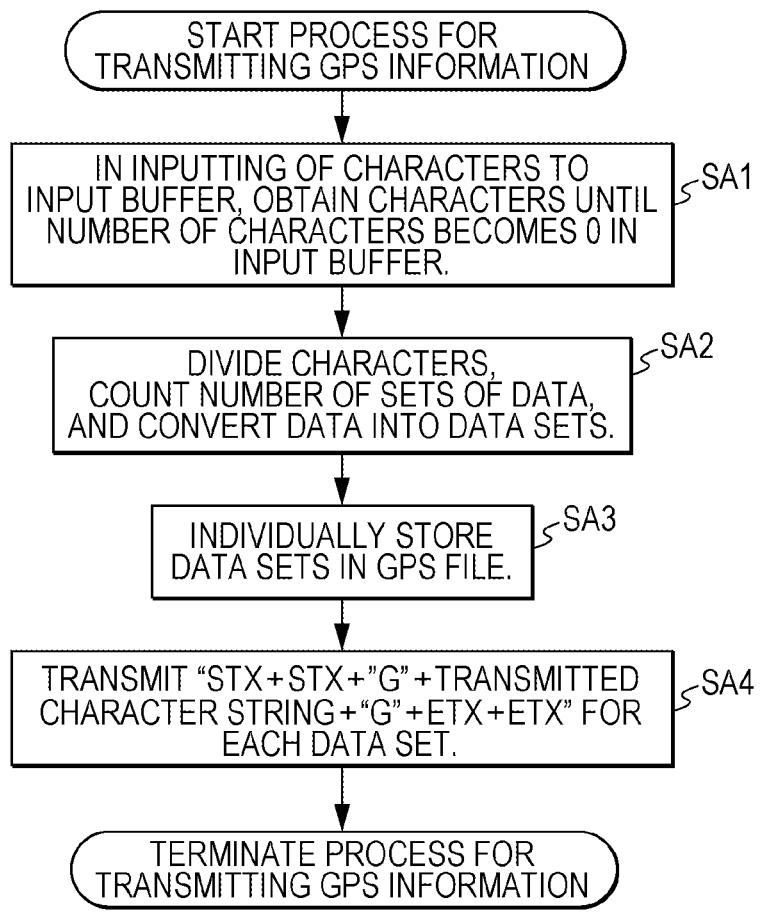
FIG. 4 is a flow chart illustrating a process for transmitting GPS information in one embodiment of the present invention.

In a case of the process for transmitting GPS information, as shown in FIG. 4, in a case where a character string of the GPS information received by the GNSS communication unit 14 is inputted to an input buffer, the computer 11 obtains characters until the number of the characters in the input buffer becomes 0 (SA1). Then, the computer 11 divides the obtained character string, counts the number of sets of data, and moreover the conversion into respective data sets is performed (SA2). Further, the storage of the data sets in a GPS file individually (SA3), The computer 11 produces and transmits packet data "STX+STX+"G"+transmission data+"G"+ETX+ETX" for each data set (SA4).

Figure 5:
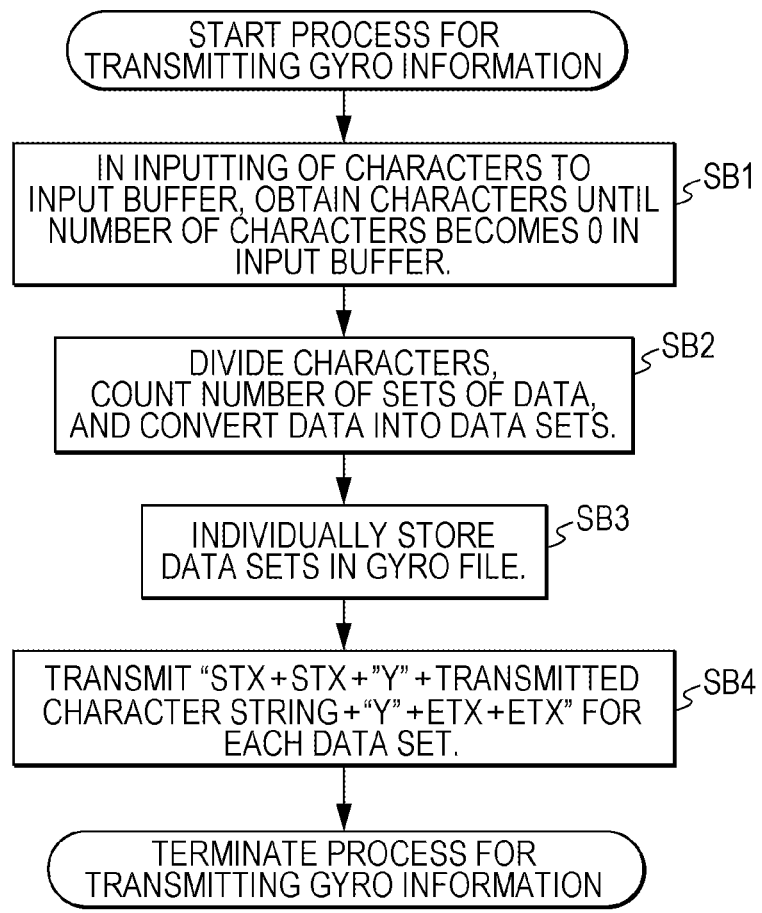
FIG. 5 is a flow chart illustrating a process for transmitting gyro information in one embodiment of the present invention.

In a case of the process for transmitting gyro information, as shown in FIG. 5, in a case where a character string of the gyro information received by the gyro communication unit 15 is inputted to the input buffer, the computer 11 obtains characters until the number of the characters in the input buffer becomes 0 (SB1). Then, the computer 11 divides the obtained character string, counts the number of sets of data, and moreover conversion into respective data sets is performed (SB2). Further, storage of the data sets in a gyro file is performed individually (SB3). The computer 11 produces and transmits packet data "STX+STX+"Y"+transmission data+"Y"+ETX+ETX" for each data set (SB4).

Figure 6:
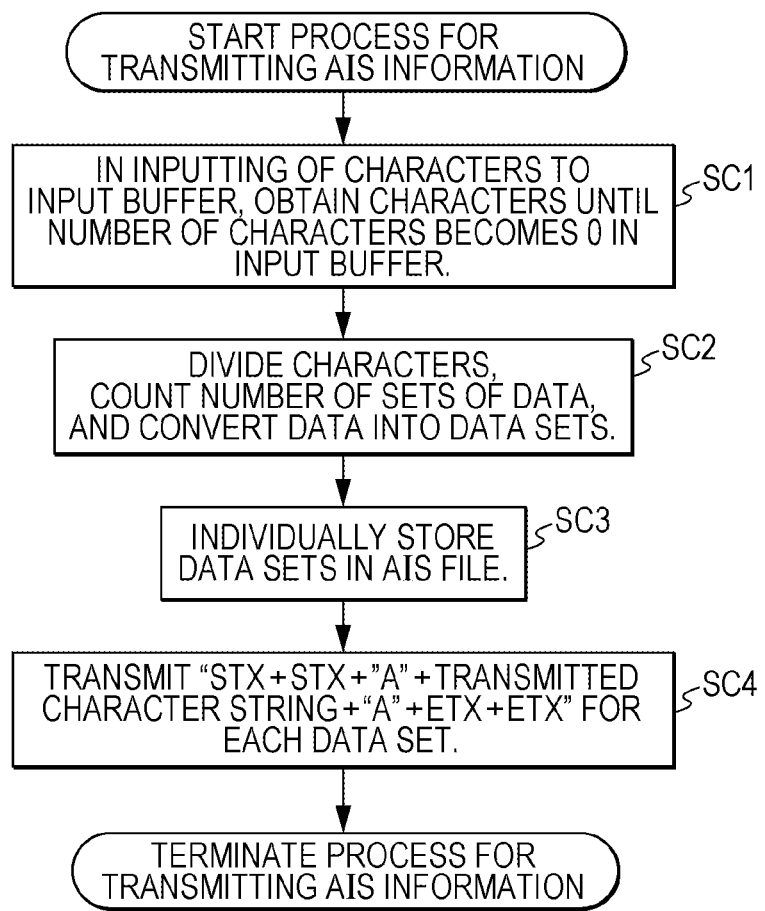
FIG. 6 is a flow chart illustrating a process for transmitting AIS information in one embodiment of the present invention.

In a case of the process for transmitting AIS information, as shown in FIG. 6, in a case where a character string of the AIS information received by the AIS communication unit 13 is inputted to the input buffer, the computer 11 obtains characters until the number of the characters in the input buffer becomes 0 (SC1). Then, the computer 11 divides the obtained character string, counts the number of sets of data, and moreover conversion into respective data sets is performed (SC2). Further, storage of the data sets in an AIS file is performed individually (SC3). The computer 11 produces and transmits packet data "STX+STX+"A"+transmission data+"A"+ETX+ETX" for each data set (SC4).

Figure 7:
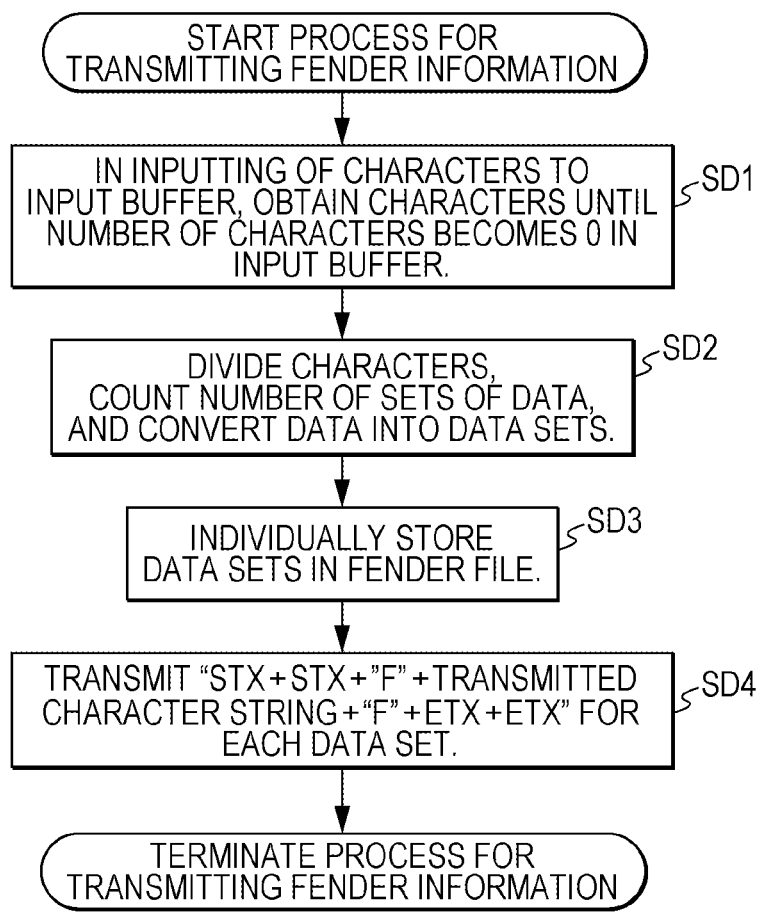
FIG. 7 is a flow chart illustrating a process for transmitting fender information in one embodiment of the present invention.

In a case of the process for transmitting fender information, as shown in FIG. 7, in a case where a character string of the fender information received by the fender communication unit 12 is inputted to the input buffer, the computer 11 obtains characters until the number of the characters in the input buffer becomes 0 (SD1). Then, the computer 11 divides the obtained character string, counts the number of sets of data, and moreover conversion into respective data sets is performed (SD2). Further, storage of the data sets in a fender file is performed individually (SD3). The computer 11 produces and transmits packet data "STX+STX+"F"+transmission data+"F"+ETX+ETX" for each data set (SD4).

Figure 8:
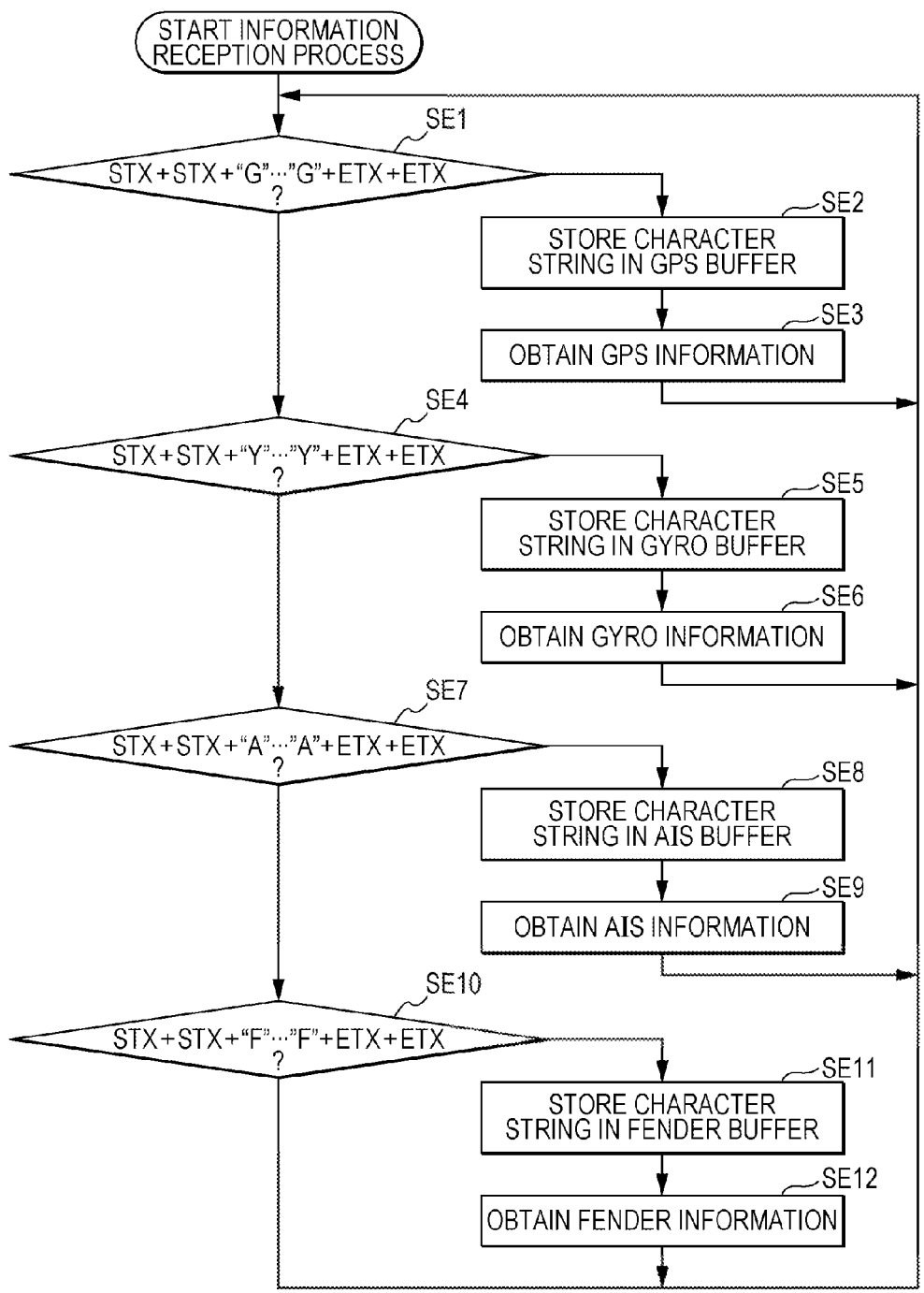
FIG. 8 is a flow chart illustrating a process for receiving information on own ship in one embodiment of the present invention.

In a case of the information reception process, as shown in FIG. 8, the computer 11 sequentially stores the received data inputted via the radio communication unit 16 in the data buffer. Then, the computer 11 sequentially analyzes the received data stored in the data buffer in order from a top. In a case where packet data of any of the OPS information, the gyro information, the AIS information, and the fender information exists in the received data, the computer 11 stores a data character string in the packet data in a GPS buffer, a gyro buffer, an AIS buffer, or a fender buffer corresponding to the information type. In this way, the computer 11 obtains the GPS information, the gyro information, the AIS information, or the fender information.

Specifically, the computer 11 determines whether or not the GPS information in form of packet data "STX+STX+"G"+transmission data+"G"+ETX+ETX" exists in the received data stored in the data buffer (SE1). In a case where the GPS information exists, the computer 11 transfers only the transmission data and stores only the transmission data in the GPS buffer (SE2). In this way, the GPS information is obtained (SE3).

As a result of determination of the step SE1, in a case where the GPS information does not exist, the computer 11 determines whether or not the gyro information in form of packet data "STX+STX+"Y"+transmission data+"Y"+ETX+ETX" exists in the received data stored in the data buffer (SE4). In a case where the gyro information exists, the computer 11, transfers only the transmission data and stores only the transmission data in the gyro buffer (SE5). In this way, the gyro information is obtained (SE6).

As a result of determination of the step SE4, in a case where the gyro information does not exist, the computer 11 determines whether or not the AIS information in form of packet data "STX+STX+"A"+transmission data+"A"+ETX+ETX" exists in the received data stored in the data buffer (SE7). In a case where the AIS information exists, the computer 11 transfers only the transmission data and stores only the transmission data in the AIS buffer (SE8). In this way, the AIS information is obtained (SE9).

As a result of determination of the step SE7, in a case where the AIS information does not exist, the computer 11 determines whether or not the fender information in form of packet data "STX+STX+"F"+transmission data+"F"+ETX+ETX" exists in the received data stored in the data buffer (SE10). In a case where the fender information exists, the computer 11 transfers only the transmission data and stores only the transmission data in the fender buffer (SE11). In this way, the fender information is obtained (SE12). Hereinafter, while the reception process is being performed, processes from the steps SE1 to SE12 are repeated.

According to this embodiment described above, one kind of information on own ship is arranged as transmission data between the two consecutive start control codes "STX" and the two consecutive termination control codes "ETX". In addition, any one of "G", "Y", "A", and "F", which is the type information denoting the information type of the transmission data, is arranged between the transmission data and the start control codes "STX" and between the termination control codes "ETX" and the transmission data. Such data arranged as described above is transmitted in form of packet data of the transmission data. Therefore, the information on own ship and sensed information on the fenders can be easily distinguished front each other. Further, a type of information transmitted as the information on own ship can be easily identified.

The present application is based on Japanese Patent Application No. 2012-162462 filed by the present applicant in Japan on Jul. 23, 2012, the entire contents of which are incorporated herein by reference.

INDUSTRIAL APPLICABILITY

Positions of own ship and a target ship alongside always can be easily displayed in animation based on the latest positional information, on the target ship alongside. Therefore, exact information can be displayed in real time. In addition, the information communication of fenders and the information communication between those two ships can be discriminated from each other. Furthermore, a type of communicated information can be easily identified.

DESCRIPTION OF REFERENCE SIGNS

1 Ship monitoring device
11 Computer
12 Fender communication unit
13 AIS communication unit
14 GNSS communication unit
15 Gyro communication unit
16 Radio communication unit
17 Display unit
18 Operation unit
2A, 2B, 2C, and 2D Fender
3A, 3B, 3C, and 3D Transmitter
31 AIS device
32 GNSS device
33 Gyro sensor
SP1 Own ship
SP2 Target ship alongside

The invention claimed is:

1. A ship monitoring device, comprising:
   a display unit for displaying, on the basis of information on own ship navigating on the sea and information on a target ship alongside, animation of a position of the own ship and a position of the target ship alongside to display a state in which the own ship and the target ship alongside come alongside each other;
   a sensed information communication unit including a specified low power radio for receiving internal air pressure information as sensed information in form of packet data, the internal air pressure information being transmitted from specified low power radios provided in a plurality of fenders, respectively, the plurality of fenders being provided in the own ship and serving as a cushioning material that is disposed between the own ship and the target ship alongside in a case where the own ship and the target ship alongside come alongside each other; and
   means for transmitting information on own ship, the means including a specified low power radio for transmitting the information on own ship in form of packet data to the target ship alongside, the information on own ship being one or more kinds of information including, as one kind of the information, the sensed information contained in the packet data received by the sensed information communication unit, wherein,
   the packet data transmitted from the plurality of fenders comprises the sensed information being arranged between a single start control code and a single termination control code, and
   the packet data transmitted from the means for transmitting information on own ship comprises the information on own ship being arranged between two consecutive start control codes and two consecutive termination control codes, and type information indicating an information type of the information on own ship, the type information being arranged between the information on own ship and the two consecutive start control codes and between the two consecutive termination control codes and the information on own ship.

2. The ship monitoring device according to claim 1, wherein
   after the means for transmitting information on own ship transmits the start control codes of the one kind of the information on own ship, the means for transmitting information on own ship transmits no additional kind of information until the means for transmitting information on own ship transmits the termination control codes indicating that transmission of the information on own ship is completed.

3. The ship monitoring device according to claim 2, wherein the sensed information further includes an internal temperature.

4. The ship monitoring device according to claim 3, wherein the sensed information further includes a serial number of a sensor included in the plurality of fenders.

5. The ship monitoring device according to claim 3, wherein a kind of the information on own ship is at least one among GPS information, gyro information, AIS information, and fender information.

6. The ship monitoring device according to claim 4, wherein a kind of the information on own ship is at least one among GPS information, gyro information, AIS information, and fender information.

7. The ship monitoring device according to claim 2, wherein the sensed information further includes a serial number of a sensor included in the plurality of fenders.

8. The ship monitoring device according to claim 7, wherein a kind of the information on own ship is at least one among GPS information, gyro information, AIS information, and fender information.

9. The ship monitoring device according to claim 2, wherein a kind of the information on own ship is at least one among GPS information, gyro information, AIS information, and fender information.

10. The ship monitoring device according to claim 1, wherein the sensed information further includes an internal temperature.

11. The ship monitoring device according to claim 10, wherein the sensed information further includes a serial number of a sensor included in the plurality of fenders.

12. The ship monitoring device according to claim 10, wherein a kind of the information on own ship is at least one among GPS information, gyro information, AIS information, and fender information.

13. The ship monitoring device according to claim 11, wherein a kind of the information on own ship is at least one among GPS information, gyro information, AIS information, and fender information.

14. The ship monitoring device according to claim 1, wherein the sensed information further includes a serial number of a sensor included in the plurality of fenders.

15. The ship monitoring device according to claim 14, wherein a kind of the information on own ship is at least one among GPS information, gyro information, AIS information, and fender information.

16. The ship monitoring device according to claim 1, wherein a kind of the information on own ship is at least one among GPS information, gyro information, AIS information, and fender information.

17. The ship monitoring device according to claim 1, wherein the packet data transmitted from the means for transmitting information on own ship consists sequentially of the two consecutive start control codes, the type information, the information on own ship, the type information, and the two consecutive termination control codes.

18. The ship monitoring device according to claim 1, wherein the information on own ship is a single kind of information on own ship, and the packet data transmitted from the means for transmitting information on own ship consists sequentially of the two consecutive start control codes, the type information indicating the information type of the single kind of information on own ship, the single kind of information on own ship, the type information indicating the information type of the single kind of information on own ship, and the two consecutive termination control codes.

19. The ship monitoring device according to claim 1, wherein the information on own ship is a single kind of information on own ship,
   the packet data transmitted from the means for transmitting information on own ship consists sequentially of the two consecutive start control codes, the type information indicating the information type of the single kind of information on own ship, the single kind of information on own ship, the type information indicating the information type of the single kind of information on own ship, and the two consecutive termination control codes, and the packet data transmitted from the plurality of fenders consists sequentially of the single start control code, the sensed information, and the single termination control code.

20. A ship monitoring device, comprising:
a display unit for displaying, on the basis of information on own ship navigating on the sea and information on a target ship alongside, animation of a position of the own ship and a position of the target ship alongside to display a state in which the own ship and the target ship alongside come alongside each other;
a fender on the own ship that transmits packet data to the own ship, the packet data transmitted from the fender consisting sequentially of a single start control code, information of an internal air pressure of the fender, and a single termination control code, and
a radio communication unit on the own ship that transmits packet data to the target ship, the packet data transmitted from the radio communication unit consists sequentially of two consecutive start control codes, type information indicating an information type of a single kind of information on own ship, the single kind of information on own ship, the type information indicating the information type of the single kind of information on own ship, and two consecutive termination control codes.

* * * * *